United States Patent
Jeon

(10) Patent No.: US 7,088,707 B2
(45) Date of Patent: Aug. 8, 2006

(54) METHOD FOR SETTING A R-P LINK IN MOBILE COMMUNICATION SYSTEM

(75) Inventor: Sang Yong Jeon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 613 days.

(21) Appl. No.: 10/266,571

(22) Filed: Oct. 9, 2002

(65) Prior Publication Data

US 2003/0123395 A1   Jul. 3, 2003

(30) Foreign Application Priority Data

Dec. 28, 2001  (KR) .............................. 2001/87370

(51) Int. Cl.
  *H04L 12/66* (2006.01)
  *H04Q 7/24* (2006.01)
(52) U.S. Cl. .................................... 370/354; 370/338
(58) Field of Classification Search .................... None
  See application file for complete search history.

(56) References Cited

U.S. PATENT DOCUMENTS

2002/0057662 A1* 5/2002 Lim ........................ 370/338
2002/0141369 A1* 10/2002 Perras ..................... 370/338
2002/0154627 A1* 10/2002 Abrol et al. ............... 370/352
2003/0021252 A1* 1/2003 Harper et al. ............. 370/338
2003/0073453 A1* 4/2003 Basilier .................... 455/503
2003/0198204 A1* 10/2003 Taneja et al. .............. 370/332

OTHER PUBLICATIONS

"Inter-Operability Specification (IOS) for CDMA 2000 Access Network Interfaces", TAI/EIA/IS-2001-A, Jun. 2001, pp. 109-111.

* cited by examiner

*Primary Examiner*—Duc Ho
(74) *Attorney, Agent, or Firm*—Fleshner & Kim, LLP

(57) ABSTRACT

A method is used for setting a R-P link for data transmission/reception in a mobile communication system and for setting a R-P link between packet control function (PCF) and packet data serving node (PDSN) in a mobile communication system that connects a radio network with a packet network. The method first transmits a response request message from the PCF to identify the status of two or more PDSNs in the system, then measures the RTDs of those PDSNs responded to the response request message. The method subsequently prepares a list of PDSNs that satisfy a reference value among the measured RTDs and determines whether the subscriber's PDSN exists in the list of PDSNs. Finally, the method performs a R-P link setup using the prepared list of PDSN in accordance with a determined result.

22 Claims, 5 Drawing Sheets

METHOD FOR SETTING A R-P LINK IN MOBILE COMMUNICATION SYSTEM

BACKGROUND OF THE INVENTION

1. Field of the Invention

The present invention relates to a method for setting a R-P link for data transmission and reception in a mobile communication system, and more particularly, to a method for setting a R-P link in which a base station controller and packet control function (BSC/PCF) manages the status of a packet data serving node (PDSN). The packet data serving node (PDSN) will transmit packet data if a mobile terminal (mobile station) requests packet data service and selects the PDSN to perform the service.

2. Background of the Related Art

FIG. 1 illustrates mobile communication network elements and their structures for packet data service according to the related art. As shown in FIG. 1, the mobile communication network elements include a mobile station (MS) 101 for a user and a base transceiver station (BTS) 102.

The MS 101 is connected with the BTS 102 with radio frequency. The BTS 102 is also connected to a base station controller (BSC)/Packet control function (PCF) 103. The BSC/PCF 103 is then connected to a mobile switching center (MSC)/visitor location register (VLR) 104. The MSC/VLR 104 is subsequently connected to a home location register (HLR) 105. Thus, the mobile communication network can communicate with other communication networks 106 such as PSTN, PCS, public land mobile network (PLMN). The BSC/PCF 103 can be connected with intranet 108, and further connected to Internet through PDSN 107.

In the mobile communication as shown in FIG. 1, if a terminal that provides code division multiple access (CDMA) 2000 packet data service requests packet data service, PDSN (107) determines whether to transmit packet data based on the BSC/PCF 103. In this case, a radio traffic channel and a radio link protocol (RLC) are set between the mobile station 101 and the BSC 103 in a radio frequency. An A8 traffic link that transmits point to point protocol (PPP) link data between the mobile terminal 101 and the PDSN 107 is set between the BSC 103 and the PCF 103. An A10 R-P link that transmits PPP link data between the mobile terminal 101 and the PDSN 107 is set between the PCF 103 and the PDSN 107.

In the above structure, the A8 interface carries a user traffic between the base station 101 and the PCF 103. The A10 interface carries a user traffic between the PCF 103 and the PDSN 107. At this time, examples of the packet data service connection state of the mobile terminal 101 is divided into packet data service active state and packet data service inactive state. The packet data service inactive state means that the mobile terminal 101 cannot obtain packet data service. Once packet data service is activated by packet data call originated from a user of the terminal or other method, the packet data service inactive state is then changed into the packet data service active state. In the packet data service active state, the PPP link is set between the MS 101 and the PDSN 107 and the R-P link is also set between the PCF 103 and the PDSN 107.

The packet data service active state includes a packet active state and a packet dormant state. The packet active state means that the MS 101 occupies a radio traffic channel and sets an R-P link in order to maintain A8 link and transmit and receive packet data. On the other hand, the packet dormant state means that the BSC 103 is out of the control of the MS 101 and a radio traffic channel by releasing a radio channel and A8 link.

FIG. 2 is a flow chart illustrating a related art for setting a R-P link. In a related art IS-2001 standard, PDSN selection algorithm for setting a R-P link manages the whole PDSN list, divides International Mobile Subscriber Identity (IMSI) number (for example, subscriber's phone number) by the number of all the PDSNs, and selects PDSN with the remainder (modulo calculation), thereby trying to set the R-P link. An A11 (interface that carries signaling information between PCF and PDSN) registration request is tried by the selected PDSN.

Referring to FIG. 2, whether a subscriber pertains to any PDSN by performing modulo calculation of all the PDSNs is first determined in step 21. Then the R-P setup for the PDSN to which the subscriber pertains from the list of all the PDSNs is tried in step 22. Thereafter, whether there is a response from the first tried PDSN is determined in step 23. If there is a response from the first tried PDSN, the R-P is set as shown in step 25. If there is no response from the first tried PDSN, the R-P setup for the next PDSN from the list of all the PDSNs is repeatedly tried as shown in step 24.

In more detail, a mobile IMSI number (subscriber's phone number) is divided by the number of all the PDSNs, so as to confirm whether the subscriber pertains to any PDSN, as follows.

PSDN No.=(Mobile IMSI Number) Modulo N

| PDSN Number | PDSN IP address |
|---|---|
| 0 | abcd |
| 1 | klmn |
| 2 | opqur |
| . | . |
| . | . |
| . | . |
| N-1 | wxyz |

If the PDSN number of the subscriber is 0 by the above modulo calculation, the PCF tries to set R-P at PDSN of 0 when a new call originates. As a result, if there is no A11 registration response, i.e., if R-P setup is failed, R-P setup for the next PDSN number of 1 is tried (PDSN No.=(PDSN No.+1) modulo N). However, the aforementioned related art method for setting R-P has several problems. Since the R-P setup is sequentially tried for the PDSNs without managing the status of the PDSNs, the R-P setup time may be delayed if R-P setup for an abnormal PDSN is tried. Furthermore, even in case that the above R-P setup is repeated until the R-P setup for a normal PDSN next to the abnormal PDSN is tried, data transmission may be delayed if the selected PDSN has a great round trip delay (RTD).

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Accordingly, it is an object of the present invention to provide a method for setting up R-P link for data transmission/reception in a mobile communication system that restricts the R-P link setup for an abnormal PDSN by considering the PDSN having no response under an abnormal status through an Internet control message protocol (ICMP). Echo request message transmitted from a PCF to identify the status of PDSN, thereby reducing the R-P link setup time between the PCF and the PDSN.

Another object of the present invention is to provide a method for setting R-P for data transmission/reception in a mobile communication system that initially restricts the R-P link setup for PDSN having no RTD value and does not fulfill a reference value by storing a round trip delay (RTD) value through the ICMP. Echo request message to improve a transmission rate of a traffic message prevents a remote PDSN for a mobile station (such as subscriber's call) from being selected and, therefore, minimize the transmission delay.

In order to achieve the above-described objects of the present invention in whole or in part, there is provided a method for setting a R-P link between PCF and PDSN in a mobile communication system that connects a radio network with a packet network. The method includes transmitting a response request message from the PCF to identify the status of two or more PDSNs, measuring RTDs of the PDSNs responded to the response request message and preparing a list of PDSNs that satisfy a reference value among the measured RTDs. The method further includes determining whether a subscriber pertains to a particular PDSN, determining whether the subscriber's PDSN exists in a list of PDSNs, and performing R-P link setup using the prepared list of PDSN in accordance with the determined result.

In a preferred embodiment of the present invention, the status of PDSN and RTD values are measured and RTD levels are assigned, the R-P link setup time between the PCF and the PDSN can then be reduced and the data transmission rate can be improved.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

In a mobile communication system, such as an advanced system of IS-2000, according to the present invention, the R-P link setup for an abnormal PDSN is restricted by the related PDSN not responding as being under an abnormal status through an Internet control message protocol (ICMP). Echo request message transmitted from a PCF to identify the status of a particular PDSN, thereby shortening the R-P link setup time between the PCF and the PDSN.

To improve a transmission rate of a traffic message, a round trip delay (RTD) value through the ICMP echo request message response is stored so that the R-P link setup for the PDSN having no RTD value and not fulfilling a reference value is initially restricted. For example, a remote PDSN for a mobile station (such as a subscriber's call) is prevented from being selected to minimize the transmission delay.

The ICMP is an Internet control message protocol (RFC.792) for connectionless transmission and is combined with an Internet protocol (IP) in a TCP/IP based Internet communication service to handle a control message for changing a transmission path and processing any error that may occur during communication. The ICMP corresponds to a network layer of open systems interconnection (OSI) basic reference model. In the present invention, the ICMP is transmitted from the PCF to identify the status of PDSN. The RTD means response time to the ICMP echo request message.

In the present invention, the PDSN having no response when the PCF transmits the ICMP echo request message to identify the status of the PDSN is regarded as being under an abnormal status. Accordingly, the non-responding PDSN is deleted from a list of PDSNs applicable to the present invention.

Figure 1:
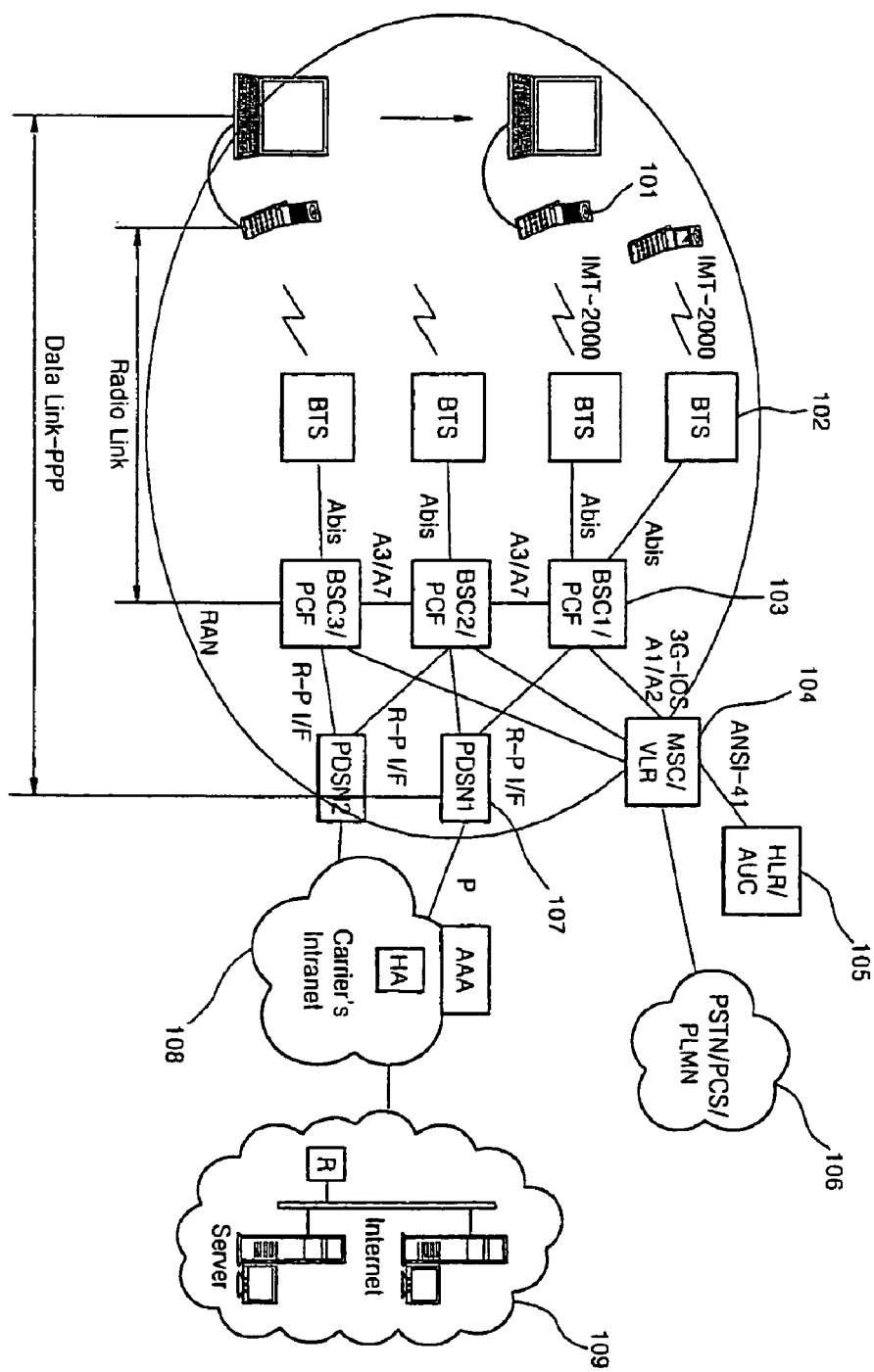
FIG. 1 illustrates a mobile communication network elements and their structure for packet data service according to the related art.
Figure 2:
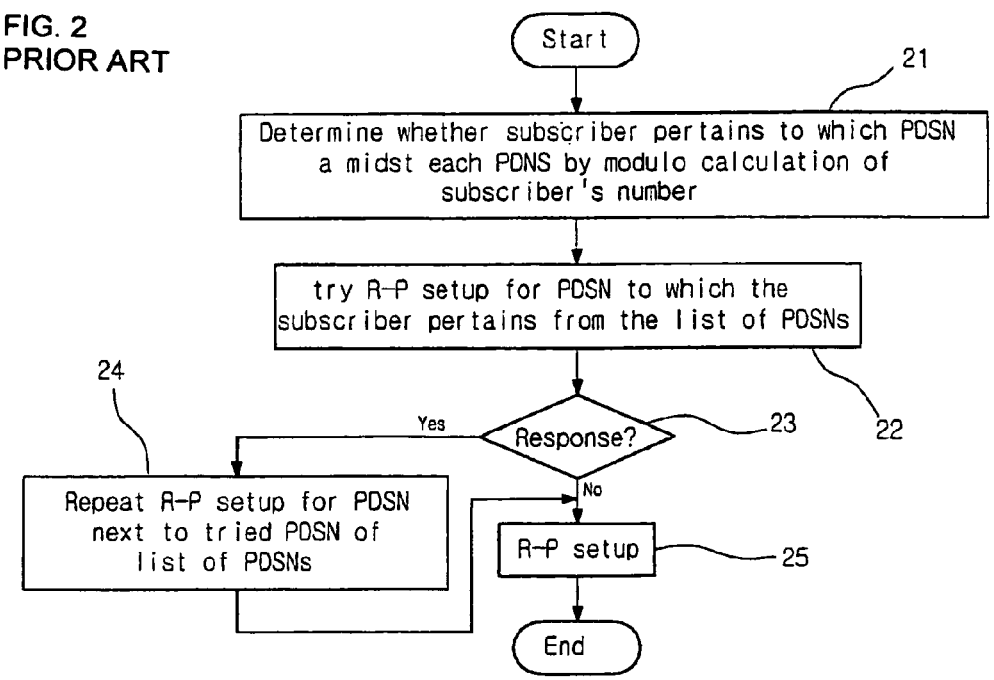
FIG. 2 is a flow chart illustrating a related art method for setting a R-P link.
Figure 3:
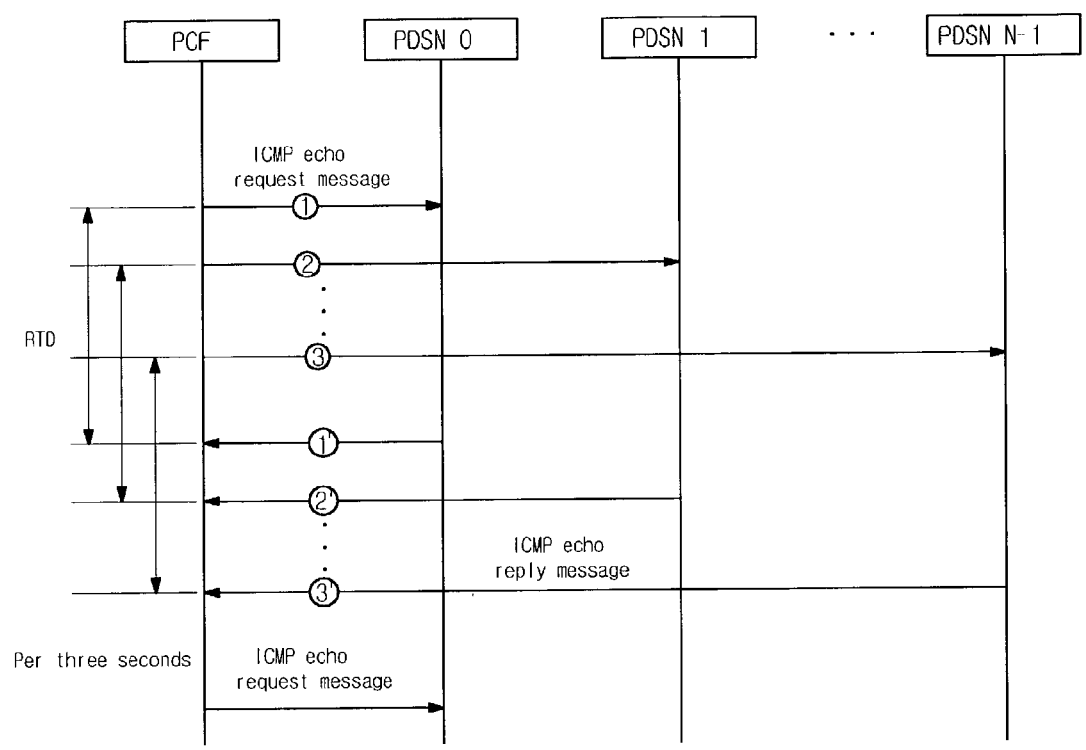
FIG. 3 is a flow chart illustrating a procedure for identifying the status of PDSN in response to ICMP echo request message, measuring RTD, and providing RTD level.

FIG. 3 is a flow chart illustrating the procedure for identifying the status of PDSN in response to the ICMP echo request message, measuring RTD, and providing RTD level. As shown in FIG. 3, PCF block transmits the ICMP echo request message to identify the status of a PDSN every three seconds so as to store RTD values and response values. Since a PDSN is considered under an abnormal status if there is no response from the PDSN consecutively three times, the PCF deletes the PDSN from the list of PDSNs applicable to the present invention. Thereafter, the R-P link setup for the PDSN under the abnormal status will not be tested even if a new data call originates.

Meanwhile, if there is a response to the ICMP echo request message from the PDSN under the abnormal status after a certain time period (for example, three seconds), the PDSN is regarded as a PDSN under the normal status. The PDSN is, therefore, added to the list of PDSNs according to the present invention. PDSN obtained by the above method and RTD values can be expressed as follows.

| PDSN Number | PDSN IP address | RTD | RTD level |
| --- | --- | --- | --- |
| 0 | abcd | 100 ms | 1 |
| 1 | klmn | 150 ms | 1 |
| 2 | opqur | 500 ms | 2 |
| . | . | . | . |
| . | . | . | . |
| . | . | . | . |
| N-1 | wxyz | 50 ms | 1 |

Hence, when a new call originates, the R-P link setup is tried using the list of PDSNs. If the new call is failed due to lack of resources and the like, the R-P link setup for the next PDSN from the list of PDSNs is tried. Further, another list of PDSNs is prepared in accordance with RTD level more than a certain reference value so that R-P setup steps may sequentially be tried as follows.

| PDSN Number | PDSN IP address | RTD | RTD level |
|---|---|---|---|
| 0 | abcd | 100 ms | 1 |
| 1 | klmn | 150 ms | 1 |
| N-1 | wxyz | 50 ms | 1 |

In the present invention, the method for selecting PDSN number of a current subscriber's call and the next PDSN is that the PDSN number of the current subscriber is PDSN No.=(Mobile IMSI Number) modulo N, and the next PDSN number is PDSN No.=(PDSN No.+1) modulo N.

The RTD level algorithm according to the present invention is as follows.

1. Method for selecting a higher value (having small RTD value) from the measured RTD rate.
   1) PDSNs responding to the ICMP echo request message are selected.
   2) RTD level of the first grade is assigned for PDSNs within a certain level (for example, within 50% of high level) from the selected PDSNs.
   3) If the PDSNs selected from step 2 do not satisfy the number requested by a user or a predetermined number, RTD level is given for PDSNs that do not correspond to the range within 50% of high level by adding the PDSNs to the list of PDSNs in the order of descending RTD value.

2. Method for setting RTD level in accordance with RTD rate.
   1) After a threshold value, which is a reference value of the RTD value, is previously determined, the measured RTD value is deleted from the list of PDSNs if it is greater than the threshold value.
   2) RTD level is assigned for the RTD values within the threshold value in accordance with the size of the RTD value. If the PDSNs within the threshold value do not satisfy the number requested by a user or a predetermined number, the RTD level is assigned for PDSNs by adding the PDSNs to the list of PDSN in the order of descending RTD value.

In the above steps, the high level, the number of PDSNs, and the threshold value are variables depending on the system or communication environment.

Figure 4:
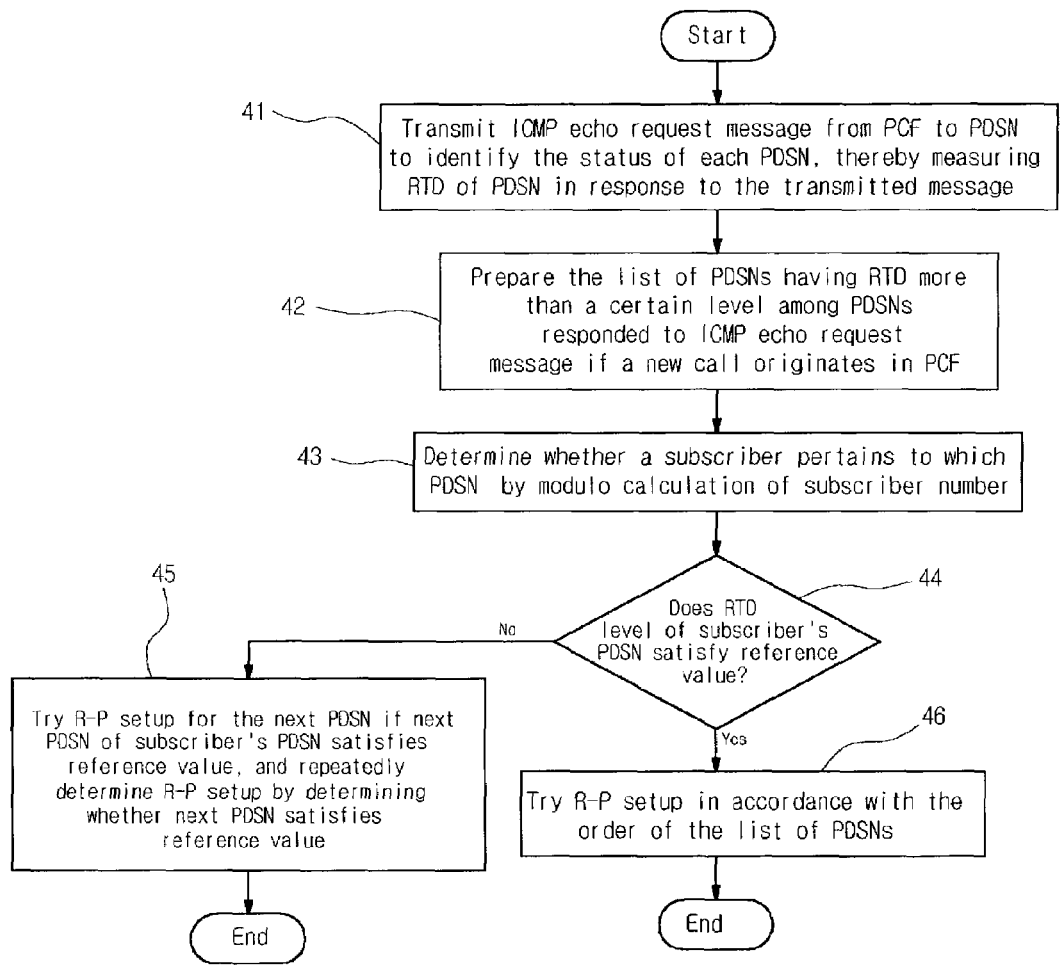
FIG. 4 is a flow chart illustrating a preferred method for setting a R-P link from a list of PDSNs, the PDSN and RTD respond to the ICMP echo request message in accordance with the first preferred embodiment of the present invention.

A method for setting R-P link from a list of PDSN, the PDSN and RTD responded to the ICMP echo request message in accordance with the first preferred embodiment of the present invention will be described with reference to FIG. 4.

The PCF transmits the ICMP echo request message to the PDSN to identify the status of each PDSN, thereby measuring RTD of PDSN in response to the transmitted message in step 41. If a new call originates in the PCF, the list of PDSNs having RTD values more than a certain level among PDSNs responded to the ICMP echo request message is prepared in step 42.

Subsequently, it is determined whether a subscriber pertains to which PDSN by modulo calculation of a subscriber number in step 43. It is also determined whether RTD level of the subscriber's PDSN satisfies a reference value in step 44. If the RTD level of the subscriber's PDSN satisfies a reference value, the R-P link setup is tried in accordance with the order of the list of PDSNs in step 46.

If RTD level of the subscriber's PDSN does not satisfy a reference value, the R-P link setup is repeatedly tried for the next PDSN of the subscriber's PDSN, as shown in step 45. In the above method for setting R-P link according to the present invention, the status of PDSN and RTD value are measured so that R-P setup time between the PCF and the PDSN is reduced using the measured RTD level and data transmission rate is improved.

A method for setting R-P link from a list of PDSN, the PDSN and RTD responded to the ICMP echo request message in accordance with the second preferred embodiment of the present invention will be described with reference to FIG. 5.

Figure 5:
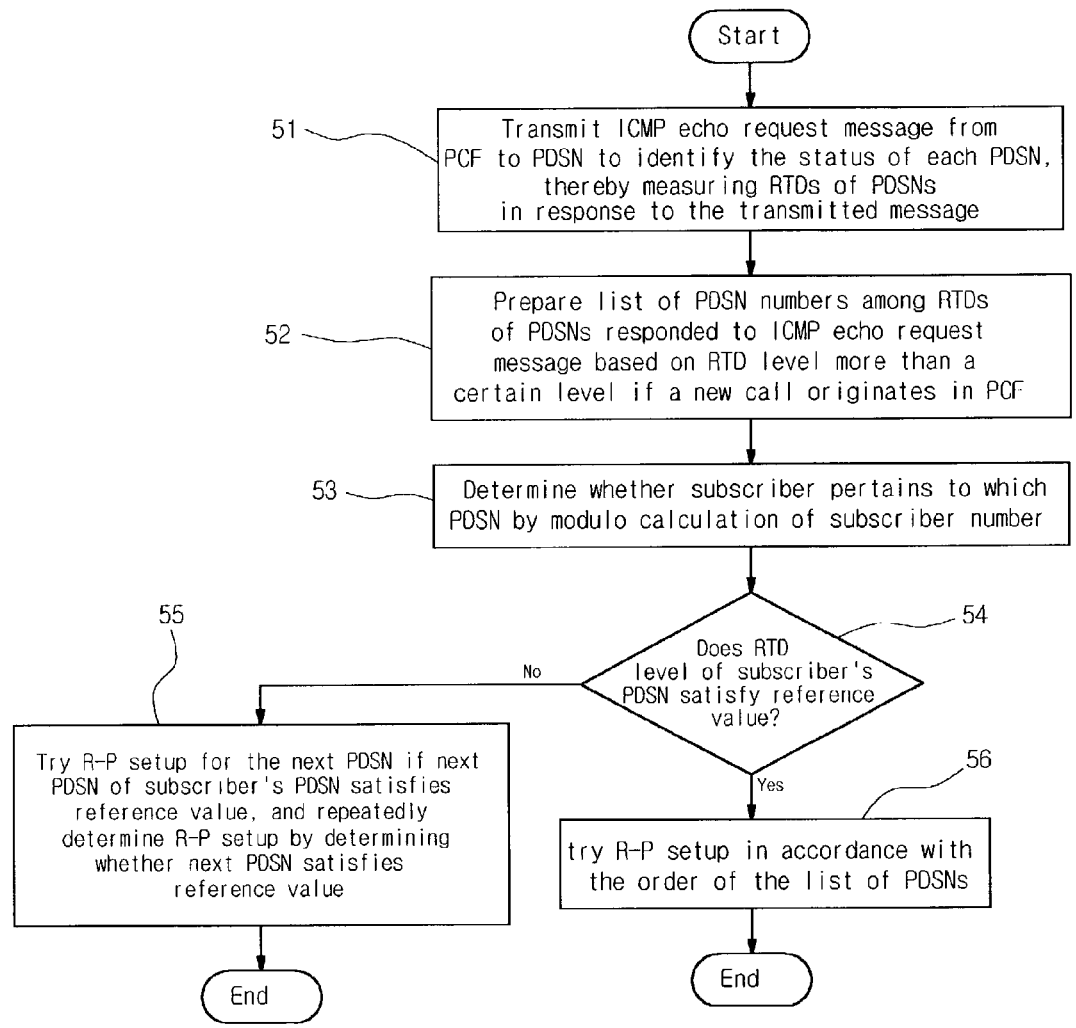
FIG. 5 is a flow chart illustrating a method for setting a R-P link from a list of PDSNs, the PDSN and RTD respond to the ICMP echo request message in accordance with the second preferred embodiment of the present invention.

As shown in FIG. 5, the PCF transmits the ICMP echo request message to the PDSN to identify the status of each PDSN, thereby measuring RTD of PDSN in response to the transmitted message in step 51. If a new call originates in the PCF, the list of PDSN among PDSNs responded to the ICMP echo request message is prepared based on the RTD level that is more than a certain level in step 52.

Subsequently, it is determined whether a subscriber pertains to which PDSN by modulo calculation of a subscriber number in step 53. It is also determined whether RTD level of the subscriber's PDSN satisfies a reference value in step 54. If the RTD level of the subscriber's PDSN satisfies a reference value, the R-P link setup is tried in accordance with the order of the list of PDSN in step 56. If RTD level of the subscriber's PDSN does not satisfy a reference value, the R-P link setup is repeatedly tried for the next PDSN of the subscriber's PDSN among PDSNs in the list of PDSNs, as shown in step 55.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for setting R-P link between packet control function (PCF) and packet data serving node (PDSN) in a mobile communication system that connects a radio network with a packet network, the method comprising:
   transmitting a response request message from the PCF to identify the status of a plurality of PDSNs;
   measuring a round trip delay of each of the PDSNs that respond to the response request message;
   preparing a list of at least two PDSNs that responded to the response request message;
   determining whether a subscriber's PDSN exists in the list of the at least two PDSNs; and
   performing R-P link setup using the prepared list of PDSNs in accordance with a determined result.

2. The method according to claim 1, wherein preparing the list includes preparing the list based on the measured round trip delay of each of the PDSNs that respond to the response request message.

3. The method according to claim 1, wherein the response request message transmitted from the PCF is an Internet control message protocol (ICMP) echo request message.

4. The method according to claim 1, wherein performing the R-P link setup occurs after determining whether the subscriber's PDSN exists in the list of the at least two PDSNs.

5. A method for setting R-P link between packet control function (PCF) and packet data serving node (PDSN) in a mobile communication system that connects a radio network with a packet network, the method comprising:
   transmitting a response request message from the PCF to identify the status of two or more PDSNs;
   measuring round trip delays (RTDs) of the PDSNs that responded to the response request message;
   preparing a list of PDSNs that satisfy a reference value among the measured RTDs;
   determining whether a subscriber pertains to a PDSN;
   determining whether the subscriber's PDSN exists in the list of PDSNs; and
   performing R-P link setup using the prepared list of PDSNs in accordance with a determined result.

6. The method according to claim 5, wherein the response request message transmitted from the PCF is an Internet control message protocol (ICMP) echo request message.

7. The method according to claim 6, wherein the PDSN having no response to the response request message after a predetermined number of times is regarded as an abnormal PDSN.

8. The method according to claim 7, wherein if there is a response to the ICMP echo request message from the PDSN under the abnormal status after a certain time period, the PDSN is regarded as being under the normal status, thereby adding the PDSN to the list of PDSNs.

9. The method according to claim 5, further comprising measuring a response time of the response request message transmitted from the PCF.

10. The method according to claim 5, further comprising selecting M number of PDSNs that responded to the response request message, and assigning a RTD level to the RTD of a predetermined high rate among the selected M number of PDSNs.

11. The method according to claim 10, further comprising adding the RTD value less than the predetermined high rate to the list of PDSNs if the number of RTDs does not satisfy the predetermined number.

12. The method according to claim 10, wherein an order of the PDSNs at the list of PDSNs is determined by the order of PDSNs accessed by a subscriber to the RTD level that satisfies a predetermined RTD threshold value.

13. The method according to claim 10, wherein an order of the PDSNs at the list of PDSNs is determined based on the order of RTD levels.

14. The method according to claim 5, further comprising:
   selecting a threshold value which is a reference value of the RTD;
   selecting N number of PDSNs of which the corresponding measured RTD value satisfies the threshold value; and
   assigning a RTD level to the selected N number of PDSNs.

15. The method according to claim 14, wherein the N number of PDSNs are selected if the measured RTD values are smaller than the threshold value.

16. The method according to claim 14, further comprising adding the measured RTD values greater than the threshold value to the list of PDSNs if there is no measured RTD value less than the threshold value.

17. The method according to claim 14, further comprising adding the RTD values greater than the threshold value to the list of PDSNs if the number of RTDs having smaller RTD values that do not satisfy the predetermined number among the selected N number of PDSNs.

18. The method according to claim 5, further comprising performing a R-P link setup in accordance with an order of the list of PDSNs if the subscriber's PDSN exists in the list of PDSNs and performing a R-P link setup for a PDSN next to the subscriber's PDSN if the subscribers' PDSN does not exist in the list of PDSNs.

19. The method according to claim 18, further comprising repeatedly performing a R-P link setup for the next PDSN if the PDSN next to the subscriber's PDSN does not exist in the list of PDSNs.

20. A method for establishing a communications link, comprising:
   determining a status of a packet data serving node (PDSN), wherein determining the status includes:
     selecting a number of PDSNs that respond to a response request message, and
     assigning a round trip delay (RTD) level to a predetermined high rate among the number of PDSNs; and
   establishing an R-P setup link between the PDSN and a packet control function (PCF) if the status of the PSDN matches a desired status and based on the assigned round trip delay level.

21. The method of claim 20, wherein said desired status is not an abnormal status of the PDSN.

22. The method of claim 20, further comprising transmitting the response request message from the PCF to identify the status of two or more PDSNs.

* * * * *